US005374092A

United States Patent [19]

Salinas

[11] Patent Number: 5,374,092

[45] Date of Patent: Dec. 20, 1994

[54] GEMSTONE/SMALL OBJECT RETRIEVER

[75] Inventor: Steve E. Salinas, #6 Park Briar, Baytown, Tex. 77521

[73] Assignee: Steve E. Salinas, Baytown, Tex.

[21] Appl. No.: 899,993

[22] Filed: Jun. 17, 1992

[51] Int. Cl.[5] .......................... B25J 15/08; B25J 19/00

[52] U.S. Cl. .................................... 294/66.2; 294/99.2

[58] Field of Search ................ 294/1.2, 33, 66.1, 66.2, 294/99.2; 81/6, 7; 114/66; 359/894, 895; 441/135

[56] References Cited

U.S. PATENT DOCUMENTS

| | | | |
|---|---|---|---|
| 327,394 | 9/1885 | Hemsley | 294/99.2 |
| 467,630 | 1/1892 | Roland | 294/99.2 X |
| 678,467 | 7/1901 | Groomes | 114/66 X |
| 895,355 | 8/1908 | Farr | 294/66.2 |
| 1,989,443 | 1/1935 | Arnold | 294/66.2 |
| 2,387,054 | 10/1945 | Brustolon | 294/99.2 X |
| 2,435,741 | 2/1948 | Fleenor | 294/99.2 X |
| 4,553,819 | 11/1985 | Correll | 441/135 X |
| 4,602,846 | 7/1986 | Karnes | 359/894 X |

FOREIGN PATENT DOCUMENTS

| | | | |
|---|---|---|---|
| 577784 | 9/1924 | France | 114/66 |
| 44999 | 4/1977 | Japan | 441/135 |

*Primary Examiner*—Johnny D. Cherry

[57] ABSTRACT

A handheld device used for the location and retrieval of gemstones and other small objects from jewelry cleaners, specifically, from ultrasonic jewelry cleaners. A device consisting of a hollow sighting shaft (1), a transparent lens (2), and a resilient "L" shaped tweezer like gripping mechanism (3). A device which will allow the user to quickly and easily locate and retrieve gemstones or other small objects of value from ultrasonic jewelry cleaners. A device that will do away with the tiresome, frustrating, and messy task of straining the liquid cleaning solution used in an ultrasonic jewelry cleaner each time a gemstone or other small object of value becomes loose in the jewelry cleaner.

1 Claim, 1 Drawing Sheet

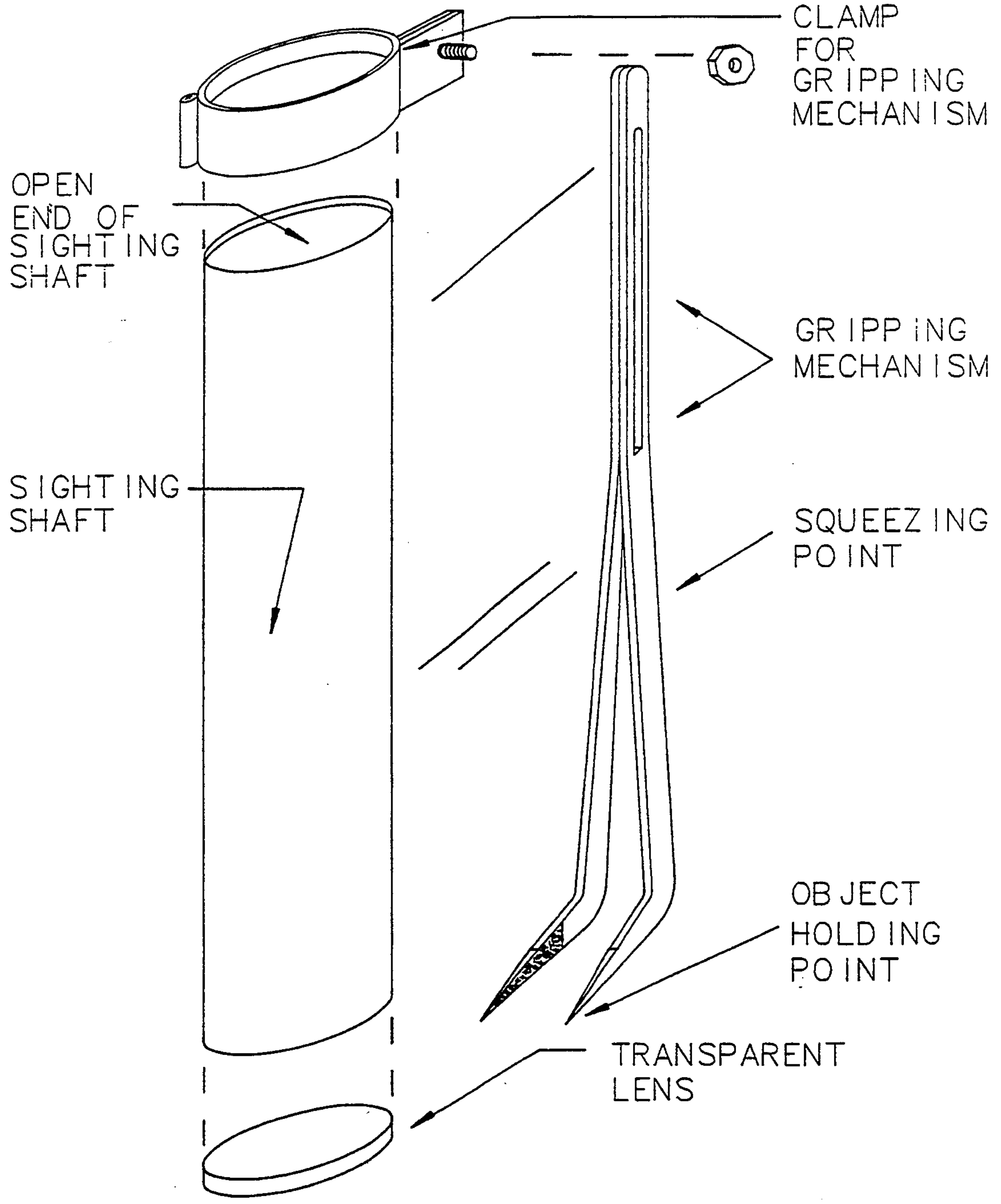
CLAMP
FOR
GRIPPING
MECHANISM
OPEN
END OF
SIGHTING
SHAFT
GRIPPING
MECHANISM
SIGHTING
SHAFT
SQUEEZING
POINT
OBJECT
HOLDING
POINT
TRANSPARENT
LENS

GEMSTONE/SMALL OBJECT RETRIEVER

BACKGROUND - Field of the Invention

This invention relates to the retrieval of loose gemstones and other small objects, specifically to such gemstones and small objects that are loose in an ultrasonic jewelry cleaner.

Background

Ultrasonic jewelry cleaners are in widespread use by professional jewelers and jewelry stores alike.

Ultrasonic jewelry cleaners provide an efficient means of cleaning jewelry. However, problems occur when an individual gemstone or other small object becomes dislodged from its setting while in said cleaner. A loose gemstone or other small object in said cleaner is extremely difficult to locate and retrieve from said cleaner due to the murkiness and heat of the liquid cleaning solution used in said cleaner.

Thus, if a gemstone or other small object should become dislodged from its setting while in an ultrasonic jewelry cleaner, one must go through the time consuming task of straining the liquid cleaning solution used in said cleaner to retrieve the loose gemstone or small object.

Objects and Advantages

Accordingly, objects and advantages of my invention are:

(a) to provide an instrument that can quickly and easily locate a loose gemstone or other small object in an ultrasonic jewelry cleaner;

(b) to provide an instrument that can quickly and easily retrieve a loose gemstone or other small object from an ultrasonic jewelry cleaner;

(c) to provide an instrument that will save the user considerable time and frustration when retrieving a loose gemstone or other small object from an ultrasonic jewelry cleaner.

(d) to provide an instrument that will help prevent accidental loss of valuable gemstones or other small objects of value;

Further objects and advantages are to provide an instrument which will not damage loose gemstones or other small objects, which is simple to use, which can be used repeatedly, and which obviates the need to strain the cleaning solution each time a gemstone or other small object becomes loose in an ultrasonic jewelry cleaner. Still further objects and advantages will become apparent from a consideration of the ensuing description and drawings.

DRAWING FIGURE

FIG. 1 shows a scale drawing of the gemstone/small object retriever with all aspects clearly labelled.

Reference Numerals In Drawings 1. sighting shaft
1*a*. open end of sighting shaft
2. transparent lens
3. gripping mechanism
3*a*. squeezing point
3*b*. object holding point

DESCRIPTION-FIGURES

FIG. 1 shows a perspective view of a basic version of my gemstone/small object retriever. The gemstone/small object retriever consists of an elongated hollow sighting shaft 1 with both ends open, a transparent lens 2, and a gripping mechanism 3. In the preferred embodiment of the gemstone/small object retriever the sighting shaft 1 is constructed from a rigid non-corrosive material such as stainless steel and is tubular in shape. However, the sighting shaft 1 can be constructed from other rigid materials such as glass, rubber, plastic, etc, and can be made in a variety of shapes including square, triangular, octagonal etc. The sighting shaft 1 is typically 6 inches long with the openings at both ends typically being 2 inches in diameter.

The transparent lens 2 is preferably constructed from glass although other transparent materials can be used. The thickness of the transparent lens 2 would typically be about ⅛ inch with the size and dimensions being the same as the open ends of the sighting shaft 1. The transparent lens 2 is bonded to one open end of the sighting shaft 1 in such a way that the bond is liquid proof.

The gripping mechanism 3 is typically nine inches in length and is constructed of a rigid non-corrosive material, preferably stainless steel. However, other rigid materials such as plastic, wood, other metals, etc, can be used. The gripping mechanism 3 consists of two strips of rigid material bonded at one end to give them tweezer-like action. The gripping mechanism 3 is "L" shaped. The gripping mechanism 3 is bonded to the length of the sighting shaft 1 in such a way that the squeezing point **3*a* is above the open end of the sighting shaft 1*a* and the object holding point 3*b* is directly below the transparent lens 2. Furthermore, the gripping mechanism 3 is bonded to the sighting shaft 1 in such a way that the tweezer-like action of the gripping mechanism 3** can still be effected.

Operation

To operate the gemstone/small object retriever, one first picks up the said retriever and places the gripping mechanism 3 between one's thumb and index finger at the squeezing point **3*a*. Then one lowers the sighting shaft 1, transparent lens 2 and object holding point 3*b* end first, into the cleaning solution used in the ultrasonic jewelry cleaner. One then looks down the open end of the sighting shaft 1*a* through the transparent lens 2 to locate the loose gemstone or small object. Once located, one centers the gemstone or small object between the object holding point 3*b* and squeezes the gripping mechanism 3, in effect grasping the gemstone or small object at the object holding point 3*b*. While maintaining pressure at the squeezing point 3*a*** one is able to retrieve the gemstone or small object from the said jewelry cleaner.

Summary, Ramifications, and Scope

Accordingly, the reader will see that the invention provides a highly reliable time saving device which can be used by anyone with little or no training. Furthermore, this invention provides the user with a more professional appearance in the presence of customers, and this invention will eradicate the tiresome, frustrating and messy task of straining the entire amount of cleaning solution in the ultrasonic jewelry cleaner to retrieve a single gemstone or other small object.

Although the description above contains many specificities, these should not be construed as limiting the scope of the invention but as merely providing illustrations of some of the presently preferred embodiments of this invention.

Thus, the scope of the invention should be determined by the appended claims and their legal equivalents, rather than by the examples given.

I claim:

1. A handheld instrument for retrieving objects which are in a container under liquid, comprising:

(a) an elongated, hollow shaft with openings at both ends;

(b) a transparent lens;

(c) a resilient "L" shaped tweezer-like clamping device;

(d) means for joining said lens to said shaft in such a way as to provide a liquid proof covering over one open end of said shaft;

(e) means for joining said clamping device to said shaft in such a way that the object holding. Point of said clamping device protrudes past said lens whereby one can easily see objects through said lens and grasp said object with said clamping device.

* * * * *